US012567604B2

(12) United States Patent
Schäfer et al.

(10) Patent No.: US 12,567,604 B2
(45) Date of Patent: *Mar. 3, 2026

(54) PREPARATION OF NANOSTRUCTURED MIXED LITHIUM ZIRCONIUM OXIDES BY MEANS OF SPRAY PYROLYSIS

(71) Applicant: Evonik Operations GmbH, Essen (DE)

(72) Inventors: Durdu Schäfer, Rodgau (DE); Armin Wiegand, Grosskrotzenburg (DE); Harald Alff, Kahl (DE); Ryo Takata, Hanau (DE); Franz Schmidt, Frankfurt (DE)

(73) Assignee: Evonik Operations GmbH, Essen (DE)

( * ) Notice: Subject to any disclaimer, the term of this patent is extended or adjusted under 35 U.S.C. 154(b) by 778 days.

This patent is subject to a terminal disclaimer.

(21) Appl. No.: 17/641,925

(22) PCT Filed: Sep. 10, 2020

(86) PCT No.: PCT/EP2020/075275
§ 371 (c)(1),
(2) Date: Mar. 10, 2022

(87) PCT Pub. No.: WO2021/048249
PCT Pub. Date: Mar. 18, 2021

(65) Prior Publication Data
US 2022/0336841 A1     Oct. 20, 2022

(30) Foreign Application Priority Data
Sep. 13, 2019     (EP) ..................................... 19197268

(51) Int. Cl.
*H01M 10/056*     (2010.01)
*C01G 25/00*      (2006.01)
*H01M 10/0525*    (2010.01)

(52) U.S. Cl.
CPC ........ *H01M 10/056* (2013.01); *C01G 25/006* (2013.01); *H01M 10/0525* (2013.01);
(Continued)

(58) Field of Classification Search
CPC .............. H01M 10/056; C01P 2004/61; C01P 2004/62; C01P 2006/11; C01P 2006/12; C01G 25/006
See application file for complete search history.

(56) References Cited

U.S. PATENT DOCUMENTS

2004/0126298 A1 *  7/2004  Stark ................... C04B 35/6267
                                                            423/263
2016/0380263 A1   12/2016  Nakayama et al.
(Continued)

FOREIGN PATENT DOCUMENTS

CN     101466641 A     6/2009
CN     102334220 A     1/2012
(Continued)

OTHER PUBLICATIONS

English translation of EP Publication 3085668, Oct. 2016.*
(Continued)

*Primary Examiner* — Brittany L Raymond
(74) *Attorney, Agent, or Firm* — Oblon, McClelland, Maier & Neustadt, L.L.P.

(57) ABSTRACT

A process may produce mixed oxides including lithium, zirconium, and optionally at least one other than Li and Zr metal, by flame spray pyrolysis. Mixed oxides are obtainable by such a process. Such mixed oxides may be used in lithium ion batteries.

16 Claims, 9 Drawing Sheets

134892

(52) U.S. Cl.
CPC ...... *C01P 2002/72* (2013.01); *C01P 2002/85* (2013.01); *C01P 2004/03* (2013.01); *C01P 2004/04* (2013.01); *C01P 2004/61* (2013.01); *C01P 2004/62* (2013.01); *C01P 2006/11* (2013.01); *C01P 2006/12* (2013.01); *C01P 2006/40* (2013.01); *H01M 2300/0082* (2013.01); *H01M 2300/0091* (2013.01)

(56) References Cited

U.S. PATENT DOCUMENTS

| | | | |
|---|---|---|---|
| 2017/0179544 A1 | 6/2017 | Lin et al. | |
| 2019/0352189 A1* | 11/2019 | Kress | C01G 23/07 |

FOREIGN PATENT DOCUMENTS

| CN | 102906023 | A | 1/2013 |
|---|---|---|---|
| CN | 104169222 | A | 11/2014 |
| CN | 107069086 | A | 8/2017 |
| CN | 107162049 | A | 9/2017 |
| CN | 110167886 | A | 8/2019 |
| EP | 2 159 867 | A1 | 3/2010 |
| EP | 3085668 | * | 10/2016 |
| JP | 4982866 | B2 | 7/2012 |
| WO | WO 2014-203179 | * | 12/2014 |
| WO | WO 2015/173114 | A1 | 11/2015 |
| WO | WO 2018-089430 | * | 5/2018 |
| WO | WO 2018-127414 | * | 7/2018 |

OTHER PUBLICATIONS

International Search Report and Written Opinion issued Oct. 5, 2020 in PCT/EP2020/075275 filed Sep. 10, 2020, 14 pages.
Extended European Search Report issued Feb. 28, 2020 in European Patent Application No. 19197268.6 filed Sep. 13, 2019, 8 pages.
Yi, E., et al., "Key parameters governing the densification of cubic-$Li_7La_3Zr_2O_{12}Li^+$ conductors", Journal of Power Sources, vol. 352, 2017, pp. 156-164, XP029976809.
Djenadic, R., et al., "Nebulized spray pyrolysis of Al-doped $Li_7La_3Zr_2O_{12}$ solid electrolyte for battery applications", Solid State Ionics, vol. 263, 2014, pp. 49-56, XP029035046.
Yi, E., et al., "Flame made nanoparticles permit processing of dense, flexible, Li+ conducting ceramic electrolyte thin films of cubic-$Li_7La_3Zr_2O_{12}(c-LLZO)^+$", Journal of Materials Chemistry A, vol. 4, 2016, pp. 12947-12954, XP055426349.
Combined Chinese Office Action and Search Report issued Jan. 11, 2024, in corresponding Chinese Patent Application No. (English Translation only), 12 pages.
U.S. Appl. No. 17/641,925, filed Mar. 10, 2022, Schaefer, et al.
U.S. Appl. No. 10/534,952, filed May 16, 2005, Hennige, et al.
U.S. Appl. No. 16/486,589, filed Aug. 16, 2019, Esken, et al.
U.S. Appl. No. 17/638,552, filed Feb. 25, 2022, Esken, et al.
U.S. Appl. No. 17/638,549, filed Feb. 25, 2022, Esken, et al.
U.S. Appl. No. 17/641,960, filed Mar. 10, 2022, Schaeffer, et al.
U.S. Appl. No. 17/274,185, filed Mar. 7, 2021, Su et, al.
U.S. Appl. No. 17/608,557, filed Nov. 3, 2021, Huang, et al.

* cited by examiner

134908

134912

134948

134952

PREPARATION OF NANOSTRUCTURED MIXED LITHIUM ZIRCONIUM OXIDES BY MEANS OF SPRAY PYROLYSIS

CROSS-REFERENCE TO RELATED APPLICATIONS

The present application is the national stage of international application PCT/EP2020/075275, filed on Sep. 10, 2020, and claims the benefit of the filing date of European Appl. No. 19 197 268.6, filed on Sep. 13, 2019.

FIELD OF THE INVENTION

The invention relates to a process for producing mixed oxides comprising lithium and zirconium and optionally at least one other than Li and Zr metal, by means of flame spray pyrolysis, mixed oxides obtainable by this process and their use as active positive electrode materials in lithium ion batteries.

PRIOR ART

Secondary lithium ion batteries are one of the most important battery types currently used. The secondary lithium ion batteries are usually composed of an anode made of a carbon material or a lithium-metal alloy, a cathode made of a lithium-metal oxide, an electrolyte in which a lithium salt is dissolved in an organic solvent and a separator providing the passage of lithium ions between the positive and the negative electrode during the charging and the discharging processes.

In endeavour to develop secondary batteries with improved intrinsic safety and energy density, the use of solid instead of liquid electrolytes has considerably progressed in the recent time. Among such systems, secondary lithium batteries with electrodes made of lithium metal or lithium metal alloys are believed to provide high energy density and be particularly suitable. Such all-solid-state secondary lithium ion batteries should have good ion conductivity at an interface between an electrode active material and an electrolyte in order to have the required load characteristics. This high ion conductivity can be achieved by coating the surface of an active electrode material by some lithium-comprising compounds, such as $LiTi_2(PO_4)_3$, as described in JP 4982866 B2.

Mixed oxides comprising lithium find various applications in both solid state and liquid lithium ion batteries.

Thus, in in Agnew. Chem. Int., Ed. 2007, 46, pp 1-5, it has been reported, that a mixed oxide with a composition $Li_7La_3Zr_2O_{12}$ (LLZ) and a garnet-type structure, has excellent lithium resistance and can be used as a solid electrolyte in an all-solid-state lithium secondary battery.

EP 2159867 A1 describes preparation of an improved LLZ material doped with aluminium, for use in solid state electrolytes. Thus, lithium carbonate, lanthanum hydroxide and zirconium oxide are mixed together and calcined at 900-1125° C. $Al_2O_3$ is then added to the calcined LLZ material followed by a second calcination at 1180° C. to obtain an Al-doped LLZ oxide with a density of about 4 g/cm³.

Similar mixed oxides are also reported for use as coating materials for electrodes of secondary lithium batteries.

One of the general problems with cathode materials of lithium batteries is their rapid aging and thus the loss of performance during cycling. It is known that coating or doping of mixed lithium transition metal oxide particles with some metal oxides can inhibit unwanted reactions of the electrolyte with the electrode materials and thus improve the long-life stability of the lithium ion batteries.

Among other metal oxides, mixed oxides comprising zirconium have been reported for this purpose.

US2017179544A discloses preparation of lithium positive electrode materials doped with mixed metal oxides based on zirconium. Thus, in example 1 $Li_7La_3Zr_2Al_{12.0105}$ was prepared by mixing the metal salts and sintering the mixture at 1200° C. for 10 hours, followed by dry mixing with a mixed lithium transition metal oxide $Li(Li_{10/75}Ni_{18/75}Co_{9/75}Mn_{38/75})O_2$ and subsequent heating at 900° C. for 20 hours to form a lithium positive electrode material. It is evident from this preparation procedure, that only large sized sintered particles of $Li_7La_3Zr_2Al_{0.07}O_{12.0105}$ could be used in this example.

Use of such relatively large metal oxide particles containing zirconium often leads to inhomogeneous distribution and large agglomerated metal oxide particles on the surface of core cathode material and as a result, minimal or no improvements in cycling performance are observed when compared with undoped or non-coated cathode materials.

Spray pyrolysis is a known method for producing relatively small metal oxide particles.

Spray pyrolysis and flame spray pyrolysis are established processes for producing simple metal oxides as well as complex mixed metal oxides. In spray pyrolysis, metal compounds in the form of fine droplets are introduced into a high-temperature zone where they are oxidized and/or hydrolysed to give metal oxides. A special form of this process is that of flame spray pyrolysis, in which the droplets are supplied to a flame which is formed by ignition of a fuel gas and an oxygen-containing gas.

WO 2015173114 A1 describes a flame spray pyrolysis method for producing a mixed oxide powder comprising lithium, lanthanum, zirconium and optionally other metals, using the corresponding solutions comprising precursor compounds of lithium, lanthanum, zirconium and optionally other metal compounds MX as starting materials. As metal precursor compounds, it is suggested to use the inorganic compounds such as nitrates, chlorides, bromides or organic compounds such as alkoxides or carboxylates. The preferred embodiment of this patent application includes nitrates of lithium, lanthanum, zirconium, and other metals. As a solvent for metal precursors, it is suggested to use water, $C_5$-$C_{20}$ alkanes, $C_1$-$C_{15}$ alkane carboxylic acids and/or C1-C15 alkanols, with a preference being given to water and solvent mixtures containing water. In all the examples, water was used as a sole solvent for metal nitrate precursors. The BET surface area of the resulting mixed oxides varies in the range 0.19-5.1 m²/g with the mean particle size ($d_{50}$) of about 2-3 μm.

J. Mater. Chem. A, 2016, vol. 4, pp. 12947-12954 discloses preparation of a powder with the composition $Li_{6.25}Al_{0.25}La_3Zr_2O_{12}$ having a BET surface area of 16 m²/g, a primary particle size of 90 nm and an agglomerate particle size of about 5 μm, by flame spray pyrolysis starting from the ethanol solutions of lithium propionate (C3-carboxylate), alumatrane [Al(OCH₂CH₂)₃N], lanthanum isobutyrate (C4-carboxylate) and zirconium isobutyrate (C4-carboxylate).

Problem and Solution

The cited documents of the prior art teach manufacturing of the mixed lithium zirconium metal oxides by means of spray pyrolysis. However, the resulting products are reported to have relatively large particle size, low BET surface area, and usually have relatively high densities.

The problem addressed by the present invention is that of providing an improved method for manufacturing mixed lithium zirconium metal oxides usable in secondary lithium ion batteries, e.g. as components of solid-state electrolytes or constituents of electrode materials.

Specifically, this method should provide metal oxide particles with relatively small particle size, high BET surface area and low tamped density.

In the course of thorough experimentation, it was surprisingly found that lithium zirconium mixed oxides with the desired particle properties can be prepared by means of the flame spray pyrolysis method when using a special combination of metal precursors and the solvents.

The Process for Producing Mixed Oxide

The invention provides a process for producing a mixed oxide comprising lithium, zirconium and optionally at least one other than Li and Zr metal, by means of flame spray pyrolysis and optional further thermal treatment, characterized in that at least one solution of metal precursors, comprising

- a lithium carboxylate and/or a zirconium carboxylate, wherein each of these metal carboxylates contains 5 to 20 carbon atoms, and
- a solvent mixture comprising an alcohol and a carboxylic acid containing 5 to 20 carbon atoms, wherein the solvent mixture contains less than 10% by weight water, and wherein the molar ratio of the alcohol to the carboxylic acid is between 1:20 and 20:1, is used in the process.

During a flame spray pyrolysis process, the solution of metal compounds (metal precursors) in the form of fine droplets is introduced into a flame, which is formed by ignition of a fuel gas and an oxygen-containing gas, where the used metal precursors are oxidized and/or hydrolysed to give the corresponding metal oxides.

This reaction initially forms highly disperse approximately spherical primary metal oxide particles, which in the further course of the reaction coalesce to form aggregates. The aggregates can then accumulate into agglomerates. In contrast to the agglomerates, which as a rule can be separated into the aggregates relatively easily by introduction of energy, the aggregates are broken down further, if at all, only by intensive introduction of energy.

The produced metal oxides are referred to as "fumed" or "pyrogenically produced" metal oxides.

The flame spray pyrolysis process is in general described in WO 2015173114 A1 and elsewhere.

The flame spray pyrolysis preferably comprises the following steps:

- a) at least one solution of metal precursors is atomized to afford an aerosol by means of an atomizer gas,
- b) the aerosol is brought to reaction in the reaction space of the reactor with a flame obtained by ignition of a mixture of fuel gas and an oxygen-containing gas to obtain a reaction stream,
- c) the reaction stream is cooled and
- d) the solid metal oxide is subsequently removed from the reaction stream.

Examples of fuel gases are hydrogen, methane, ethane, natural gas and/or carbon monoxide. It is particularly preferable to employ hydrogen. A fuel gas is employed in particular for embodiments where a high crystallinity of the metal oxides to be produced is desired.

The oxygen-containing gas is generally air or oxygen-enriched air. An oxygen-containing gas is employed in particular for embodiments where for example a high BET surface area of the metal oxide to be produced is desired.

The total amount of oxygen is generally chosen such that, it is sufficient at least for complete conversion of the fuel gas and the metal precursors.

For obtaining the aerosol, the vaporized solution containing metal precursors can be mixed with an atomizer gas, such as nitrogen, air, and/or other gases. The resulting fine droplets of the aerosol preferably have an average droplet size of 1-120 μm, particularly preferably of 30-100 μm. The droplets are typically produced using single- or multi-material nozzles. To increase the solubility of the metal precursors and to attain a suitable viscosity for atomization of the solution, the solution may be heated.

Metal precursors employed in the inventive process include at least one lithium carboxylate and at least one zirconium carboxylates, each containing 5 to 20 carbon atoms.

The lithium and zirconium carboxylates used in the process according to the invention may independently of each other be a linear, branched or cyclic pentanoate (C5), hexanoate (C6), heptanoate (C7), octanoate (C8), nonanoate (C9), decanoate (D10), undecanoate (C11), dodecanoate (C12), tridecanoate (C13), tetradecanoate (C14), pentadecanoate (C15), hexadecanoate (C16), heprtadecanoate (C17), octadecanoate (C18), nonadecanoate (C19), icosanoate (C20) of lithium and/or zirconium, and the mixtures thereof.

Most preferably, zirconium 2-ethylhexanoate (C8) and lithium neodecanoate (C10) are used.

The used metal precursors may contain carboxylates of other than lithium and zirconium metals.

Other than those of lithium and zirconium metal precursors may also be inorganic metal compounds, such as nitrates, chlorides, bromides, or other organic metal compounds, such as alkoxides, e.g. ethoxides, n-propoxides, isopropoxides, n-butoxides and/or tert-butoxides.

At least one other than Li and Zr metal optionally contained in the mixed oxide can preferably be chosen from Na, K; Be, Mg, Ca, Sr, Ba, Zn, Co, Ni, Cu, Mn, B, Al, Ga, In, Fe, Sc, Y, La, Ti, Zr, Hf, Ce, Si, Ge, Sn, Pb, V, Nb, Ta, Mo, W, and a combination thereof. In the context of the present invention, silica and boron are to be regarded as metals, and their compounds may also be used as the metal precursors in the inventive process. Preferably, the mixed oxide of the invention contains lanthanum (La) and aluminium (Al).

The solvent mixture used in the inventive process for dissolving the metal precursors, comprises an alcohol and a carboxylic acid containing 5 to 20 carbon atoms.

The alcohol is preferably selected from the group consisting of methanol, ethanol, n-propanol, iso-propanol, n-butanol, sec-butanol, tert-butanol, n-pentanol, n-hexanol, cyclohexanol, n-octanol, 2-ethylhexanol, n-decanol, neodecanol, and the mixtures thereof.

The carboxylic acid is preferably selected from the group consisting of linear, branched or cyclic pentanoic acid (C5), hexanoic acid (C6), heptanoic acid (C7), octanoic acid (C8), nonanoic acid (C9), decanoic acid (D10), undecanoic acid (C11), dodecanoic acid (C12), tridecanoic acid (C13), tetradecanoic acid (C14), pentadecanoic acid (C15), hexadecanoic acid (C16), heprtadecanoic acid (C17), octadecanoic acid (C18), nonadecanoic acid (C19), icosanoic acid (C20), and the mixtures thereof.

The molar ratio of the alcohol to the carboxylic acid in the solvent mixture used in the present invention is between 1:20 and 20:1, preferably between 1:15 and 15:1, more preferably between 1:10 and 10:1, most preferably between 1:6 and 6:1.

The solvent mixture used in the present invention contains less than 10% by weight water, preferably less than 5% by weight water, more preferably less than less than 3% by weight water, even more preferably less than 2% by weight water, still more preferably less than 1% by weight water.

The total metal content in the solution of the metal precursors is preferably 1%-30% by weight, more preferably 2%-20% by weight, even more preferably 3%-15% by weight. Under "total metal content" is understood the total weight proportion of all metals contained in the metal precursors in the used solution of metal precursors.

The solvent mixture used for the inventive process may additionally comprise a chelating agent, i.e. a compound capable of forming two or more coordination bonds with metal ions. The examples of such chelating agents are e.g. diamines like ethylendiamine, ethylenediaminetetraacetic acid (EDTA), 1,3-dicarbonyl compounds such as acetyl acetone and alkyl acetyl acetate. Most preferably, acetyl acetone is used as such chelating agent.

It was observed that in the presence of such chelating agents, some metal precursors, for example zirconium compounds, show better solubility and no precipitation after a relatively long storage time.

The use of the special combination of metal precursors and the solvent mixture according to the invention allows to ensure good solubility of all metal precursors and to achieve the desired metal oxide particle properties such as small particle size, high BET surface area and low tamped density.

The inventive process can further comprise a a step of thermal treatment of the mixed oxide comprising lithium, zirconium and optionally at least one other than Li and Zr metal, produced by means of flame spray pyrolysis.

This further thermal treatment is preferably carried out at a temperature of 600° C.-1300° C., more preferably at 650° C.-1250° C., even more preferably at 700° C.-1200° C., still more preferably at 750° C.-1150° C.

The thermal treatment according to the inventive process allows obtaining a thermally treated metal oxide with desirable properties, especially the desired crystalline structure. Thus, for example thermal treatment of $Li_7La_3Zr_2O_{12}$ at a temperature of about 800° C.-1200° C. allows formation of a mixed metal oxide with a cubic garnet crystalline structure, particularly suitable for use in solid state electrolytes for lithium ion batteries.

The inventive process can comprise a further step of milling, preferably ball milling of the mixed oxide comprising lithium, zirconium and optionally at least one other than Li and Zr metal, produced by means of flame spray pyrolysis.

The ball milling is preferably carried out by $ZrO_2$ balls, e.g. with a diameter of about 0.5 mm in an appropriate solvent, such as ethanol or isopropanol.

Most preferably, the inventive process comprises both thermal treatment and ball milling of the thermally treated metal oxide.

The ball milling process according to the inventive process allows obtaining a ball milled metal oxide with desirable properties, especially the desired crystalline structure and particle size particularly suitable for use in lithium ion batteries. Thus, ball milled and thermally treated $Li_7La_3Zr_2O_{12}$ with a cubic garnet crystalline structure and a desired particle size, is particularly suitable for use in solid state electrolytes for lithium ion batteries.

The Mixed Oxide

The mixed oxide prepared by the process according to the present invention preferably has a BET surface area of 0.1 $m^2/g$-100 $m^2/g$.

The thermally untreated mixed oxide, i.e. the product of the inventive process, wherein no further thermal treatment has been employed, preferably has a BET surface area of 5 $m^2/g$-100 $m^2/g$, more preferably of 7 $m^2/g$-70 $m^2/g$, most preferably of 15-50 $m^2/g$.

The thermally treated mixed oxide, i.e. the product of the inventive process, wherein a further thermal treatment has been employed, preferably has a BET surface area of less than 10 $m^2/g$, more preferably 0.1 $m^2/g$-10 $m^2/g$, more preferably of 0.2 $m^2/g$-5 $m^2/g$, most preferably of 0.3-3 $m^2/g$.

The thermally treated and ball milled mixed oxide, i.e. the product of the inventive process, wherein a further thermal treatment and a ball milling process have been employed, preferably has a BET surface area of 3 $m^2/g$-30 $m^2/g$, more preferably of 4 $m^2/g$-25 $m^2/g$, most preferably of 5 $m^2/g$-20 $m^2/g$.

The BET surface area can be determined according to DIN 9277:2014 by nitrogen adsorption according to Brunauer-Emmett-Teller procedure.

The mixed oxide prepared by the process according to the invention, is usually in the form of aggregated primary particles with a numerical mean diameter of primary particles of 5-100 nm, preferably 7-70 nm, more preferably 10-50 nm, as determined by transition electron microscopy (TEM). This numerical mean diameter can be determined by calculating the average size of at least 500 particles analysed by TEM.

The numerical mean particle diameter of the (aggregated and agglomerated) mixed oxide $d_{50}$ is usually about 0.05 μm-3 μm, more preferably 0.1 μm-2 μm, even more preferably 0.15 μm-1.0 μm. This numerical mean diameter can be determined in a suitable dispersion, e.g. in an aqueous dispersion, by static light scattering (SLS) method.

The agglomerates and partly the aggregates can be destroyed e.g. by grinding or ultrasonic treatment of the particles to result in particles with a smaller particle size and a narrower particle size distribution.

Preferably, the mean particle diameter $d_{50}$ of the mixed oxide is 10-150 nm, more preferably 20-130 nm, even more preferably 30-120 nm, as determined by static light scattering (SLS) after 300 s of ultrasonic treatment at 25° C. of a mixture consisting of 5% by weight of the particles and 95% by weight of a 0.5 g/L solution of sodium pyrophosphate in water.

The span $(d_{90}-d_{10})/d_{50}$ of particles of the zirconium dioxide and/or of the mixed oxide comprising zirconium is preferably 0.4-1.2, more preferably 0.5-1.1, even more preferably 0.6-1.0, as determined by static light scattering (SLS) after 300 s of ultrasonic treatment at 25° C. of a mixture consisting of 5% by weight of the particles and 95% by weight of a 0.5 g/L solution of sodium pyrophosphate in water.

Thus, the mixed oxide prepared by the process of the present invention is preferably characterized by a relatively small particle size and narrow particle size distribution. This helps to achieve high-quality metal oxide doping and/or coating of the active electrode materials for lithium ion batteries.

The d values $d_{10}$, $d_{50}$ and $d_{90}$ are commonly used for characterizing the cumulative particle diameter distribution of a given sample. For example, the $d_{10}$ diameter is the diameter at which 10% of a sample's volume is comprised of smaller than $d_{10}$ particles, the $d_{50}$ is the diameter at which 50% of a sample's volume is comprised of smaller than $d_{50}$ particles. The $d_{50}$ is also known as the "volume median diameter" as it divides the sample equally by volume; the $d_{50}$ is the diameter at which 90% of a sample's volume is comprised of smaller than $d_{90}$ particles.

The mixed oxide prepared by the process according to the invention preferably has a tamped density of 20 g/L-1000 g/L.

The thermally untreated mixed oxide prepared by the process according to the invention preferably has a tamped density of 20 g/L-200 g/L, more preferably 30 g/L-150 g/L, even more preferably 40 g/L-130 g/L, still more preferably 50 g/L-120 g/L.

The thermally treated mixed oxide prepared by the process according to the invention preferably has a tamped density of 400 g/L-1000 g/L, more preferably 450 g/L-800 g/L, even more preferably 500 g/L-700 g/L.

Tamped density of a pulverulent or coarse-grain granular material can be determined according to DIN ISO 787-11: 1995 "General methods of test for pigments and extenders—Part 11: Determination of tamped volume and apparent density after tamping". This involves measuring the apparent density of a bed after agitation and tamping.

The mixed oxide prepared by the inventive process is preferably hydrophilic in nature, that is not further treated by any hydrophobic reagents, such as silanes, after its synthesis by a flame spray pyrolysis process. The particles thus produced usually have a purity of at least 96% by weight, preferably at least 98% by weight, more preferably at least 99% by weight, wherein the 100% purity means that the mixed oxide contains only the specified metals and the oxygen. The mixed oxide may comprise hafnium compounds in the form of hafnium dioxide. The proportion of hafnium dioxide can be 1 to 4% by weight, based on $ZrO_2$. The content of chloride is preferably less than 0.5% by weight, more preferably less than 0.1% by weight, based on the mass of the mixed oxide powder. The proportion of carbon is preferably less than 2.0% by weight, more preferably 0.005%-1.0% by weight, even more preferably 0.01%-0.5% by weight, based on the mass of the mixed oxide powder.

The mixed oxide is preferably a compound of a general formula $$Li_a Zr_b M_c O_{0.5a+2b+d} \quad (I),$$

wherein
$1.5 \leq a \leq 15$, preferably $1.8 \leq a \leq 12$;
$0.5 \leq b \leq 3.0$, preferably $0.8 \leq b \leq 3.0$;
$0 \leq c \leq 5$, preferably $1.5 \leq c \leq 4$
$d=0.5c$ for M=Na, K;
$d=c$ for M=Be, Mg, Ca, Sr, Ba, Zn, Co, Ni, Cu, Mn;
$d=1.5c$ for M=B, Al, Ga, In, Fe, Sc, Y, La;
$d=2c$ for M=Ti, Zr, Hf, Ce, Si, Ge, Sn, Pb;
$d=2.5c$ for M=V, Nb, Ta;
$d=3c$ for M=Mo, W.

In the general formula (I), M can be one or several elements selected from the group consisting of Na, K, Be, Mg, Ca, Sr, Ba, Zn, Co, Ni, Cu, Mn, B, Al, Ga, In, Fe, Sc, Y, La, Ti, Zr, Hf, Ce, Si, Ge, Sn, Pb, V, Nb, Ta, Mo, W. Preferably, M=La and Al.

The invention further provides mixed oxide comprising lithium, zirconium and optionally at least one other than Li and Zr metal,
wherein
the mixed oxide is in the form of aggregated primary particles,
has a BET surface area of 15-50 $m^2$/g,
a numerical mean particle diameter of $d_{50}$=0.1-2 μm, as determined by static light scattering (SLS), and
a tamped density of 50-200 g/L.

Such mixed oxide can be prepared by the inventive process, wherein no further thermal treatment is applied.

The invention further provides mixed oxide comprising lithium, zirconium and optionally at least one other than Li and Zr metal,
wherein
the mixed oxide is in the form of aggregated primary particles,
has a BET surface area of less than 10 $m^2$/g, preferably 0.1-10 $m^2$/g,
a numerical mean particle diameter of $d_{50}$=1-50 μm, as determined by static light scattering (SLS), and
a tamped density of 400-1000 g/L.

Such mixed oxide can be prepared by the inventive process, wherein a further thermal treatment and optionally a ball milling process is applied.

The invention further provides mixed oxide obtainable by the process according to the present invention.

Use of the Mixed Oxide in Lithium Ion Batteries

The invention further provides use of the mixed oxide according to the invention or mixed oxide obtainable by the inventive process in lithium ion battery, particularly as a component of a solid-state electrolyte of lithium ion battery, as an additive in liquid, or gel electrolyte or as a constituent of an electrode of a lithium ion battery.

The invention further provides lithium ion battery comprising the mixed oxide according to the invention or mixed oxide obtainable by the inventive process.

The lithium ion battery of the invention, apart from the active positive electrode (cathode), may contain an anode, a separator and an electrolyte containing a compound comprising lithium.

The positive electrode (cathode) of the lithium ion battery usually includes a current collector and an active cathode material layer formed on the current collector.

The current collector may be an aluminium foil, copper foil, a nickel foil, a stainless-steel foil, a titanium foil, a polymer substrate coated with a conductive metal, or a combination thereof.

The active positive electrode materials may include materials capable of reversible intercalating/deintercalating lithium ions and are well known in the art. Such active positive electrode materials may include transition metal oxides, such as mixed oxides comprising Ni, Co, Mn, V or other transition metals and optionally lithium. The mixed lithium transition metal oxides used with preference as active positive electrode materials are selected from the group consisting of lithium-cobalt oxide, lithium-manganese oxide, lithium-nickel-cobalt oxides, lithium-nickel-manganese-cobalt oxides, lithium-nickel-cobalt-aluminium oxides, lithium-nickel-manganese oxides, or a mixture thereof. The mixed lithium transition metal oxide preferably has a general formula $LiMO_2$, wherein M is at least one transition metal selected from nickel, cobalt, manganese; more preferably M=Co or $Ni_xMn_yCo_z$, wherein $0.3 \leq x \leq 0.9$, $0 \leq y \leq 0.45$, $0 \leq z \leq 0.4$.

The anode of the lithium ion battery may comprise any suitable material, commonly used in the secondary lithium ion batteries, capable of reversible intercalating/deintercalating lithium ions. Typical examples thereof are carbonaceous materials including crystalline carbon such as natural or artificial graphite in the form of plate-like, flake, spherical or fibrous type graphite; amorphous carbon, such as soft carbon, hard carbon, mesophase pitch carbide, fired coke and the like, or mixtures thereof. In addition, lithium metal or conversion materials (e.g. Si or Sn) can be used as anode active materials.

The electrolyte of the lithium ion battery can be in the liquid, gel or solid form.

The liquid electrolyte of the lithium ion battery may comprise any suitable organic solvent commonly used in the lithium ion batteries, such as anhydrous ethylene carbonate (EC), dimethyl carbonate (DMC), propylene carbonate, methylethyl carbonate, diethyl carbonate, gamma butyrolactone, dimethoxyethane, fluoroethylene carbonate, vinylethylene carbonate, or a mixture thereof.

The gel electrolytes include gelled polymers.

The solid electrolyte of the lithium ion battery may comprise oxides, e.g. lithium metal oxides, sulfides, phosphates, or solid polymers.

The liquid or polymer gel electrolyte of the lithium ion battery usually contains a lithium salt. Examples of such lithium salts include lithium hexafluorophosphate ($LiPF_6$), lithium bis 2-(trifluoromethylsulfonyl)imide (LiTFSI), lithium bis (fluorosulfonyl) imide (LiFSI), lithium perchlorate ($LiClO_4$), lithium tetrafluoroborate ($LiBF_4$), $Li_2SiF_6$, lithium triflate, $LiN(SO_2CF_2CF_3)_2$, lithium nitrate, lithium bis(oxalate)borate, lithium-cyclo-difluoromethane-1,1-bis (sulfonyl)imide, lithium-cyclo-hexafluoropropane-1,1-bis (sulfonyl)imide and mixtures thereof.

The lithium ion battery, especially the one with liquid or gel electrolyte can also comprise a separator, which prevents the direct contact between the two electrodes, which would lead to the internal short circuit.

The material of the separator may comprise a polyolefin resin, a fluorinated polyolefin resin, a polyester resin, a polyacrylonitrile resin, a cellulose resin, a non-woven fabric or a mixture thereof. Preferably, this material comprises a polyolefin resin such as a polyethylene or polypropylene based polymer, a fluorinated resin such as polyvinylidene fluoride polymer or polytetrafluoroethylene, a polyester resin such as polyethylene terephthalate and polybutylene terephthalate, a polyacrylonitrile resin, a cellulose resin, a non-woven fabric or a mixture thereof.

EXAMPLES

Commercial mixed lithium nickel manganese cobalt oxide powder NMC (7-1.5-1.5) (Type PLB-H7) with a BET surface area of 0.30-0.60 $m^2$/g, a medium particle diameter $d_{50}$=10.6±2 μm (determined by static laser scattering method), was supplied by Linyi Gelon LIB Co.

Commercial polyethylene oxide (PEO, from Sigma-Aldrich) with an average molecular weight of $4*10^5$ g/mol was used for the electrolyte formulation. PEO was used as received. Lithium bis(trifluoromethanesulfonyl)imide (LiTFSI) from Kishida with a purity >99% (battery grade) was used as received in the glove box.

Commercial lithium deposited Cu foil was purchased from Honjo Metal, the thickness of the copper layer is 10 μm and the thickness of lithium layer is 20 μm.

Comparative Example 1

Li—La—Zr—Al Mixed Oxide from Aqueous Nitrate Precursors 18,63 kg of an aqueous solution containing 1142 g $LiNO_3$, 2839 g $La(NO_3)_3*6H_2O$, 1670 g $Zr(NO_3)_4$ (metal content: 24 wt %) and 212 g $Al(NO_3)_3*9H_2O$ was prepared under constant stirring until a clear solution was obtained. This solution corresponds to a composition $Li_{7.54}La_3Zr_2Al_{0.26}O_{12.66}$.

An aerosol was formed of 2.5 kg/h of this solution and 15 $Nm^3$/h of air via a two-component nozzle and sprayed into a tubular reaction with a burning flame. The burning gases of the flame consist of 20 $Nm^3$/h hydrogen and 75 $Nm^3$/h of air, resulting in a control temperature at the measurement point one meter below the spray nozzle of 900° C. Additionally, 25 $Nm^3$/h of secondary air was used. After the reactor the reaction gases were cooled down and filtered.

Figure 1A:
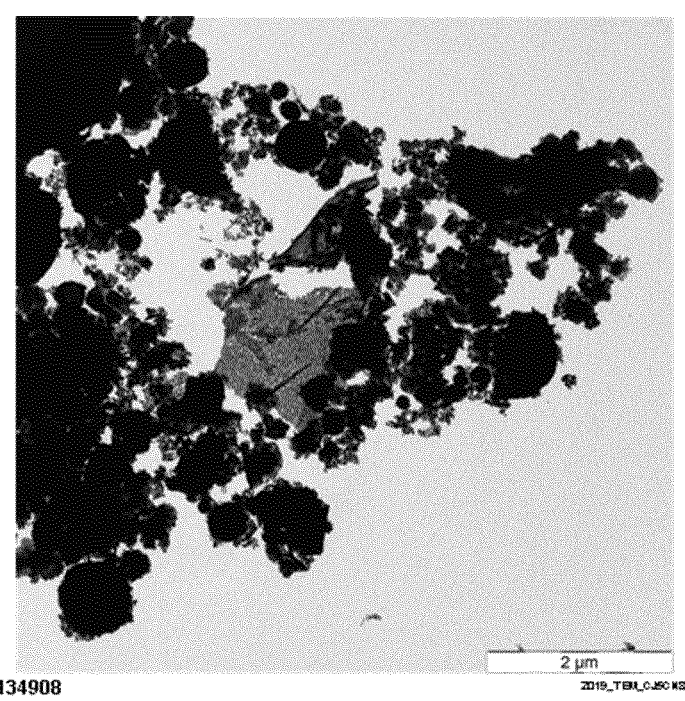
FIGS. 1A and 1B are TEM images of Li—La—Zr—Al mixed oxide particles prepared as described in comparative example 1.
Figure 1B:
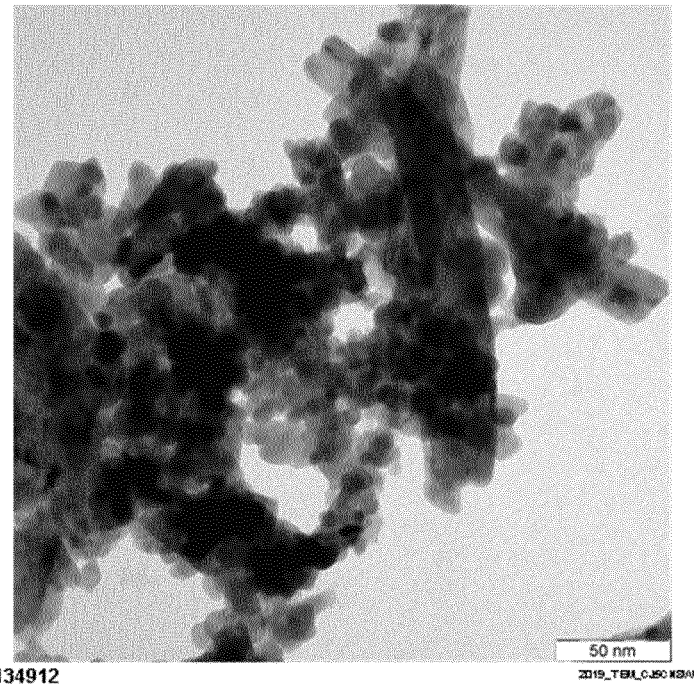

The particle properties are shown in table 1, the TEM images of the particles are shown in FIGS. 1A and 1B.

Preparation of an NMC Powder Coated with Li—La—Zr—Al Mixed Oxide of Comparative Example 1

The NMC-powder (99 g) was mixed with 1.0 g (1 wt %) of the fumed powder of the comparative example 1 in a high intensity laboratory mixer (Somakon mixer MP-GL with a 0.5 L mixing unit) at first for 1 min at 500 rpm (specific electrical power: 350 W/kg NMC) to homogeneously mix the two powders. Afterwards the mixing intensity was increased to 2000 rpm (specific electrical power: 800 W/kg NMC, tip-speed of the mixing tool in the mixing unit: 10 m/s) and the mixing was continued for 5 min to achieve the dry coating of the NMC particles by the fumed powder of the comparative example 1.

Comparative Example 2

Li—La—Zr—Al Mixed Oxide from Ethanolic Nitrate Precursors 18,3 kg of an ethanolic solution containing 779 g $LiNO_3$, 1930 g $La(NO_3)_3*6H_2O$, 1139 g $Zr(NO_3)_4$ (metal content:

24 wt %) and 146 g $Al(NO_3)_3*9H_2O$ was prepared under constant stirring until a clear solution was obtained. This solution corresponds to a composition $Li_{7.54}La_3Zr_2Al_{0.26}O_{12.66}$.

An aerosol was formed of 2.5 kg/h of this solution and 15 $Nm^3/h$ of air via a two-component nozzle and sprayed into a tubular reaction with a burning flame. The burning gases of the flame consist of 13.7 $Nm^3/h$ hydrogen and 75 $Nm^3/h$ of air, resulting in a control temperature at the measurement point one meter below the spray nozzle of 900° C. Additionally, 25 $Nm^3/h$ of secondary air was used. After the reactor the reaction gases were cooled down and filtered.

Figure 2A:
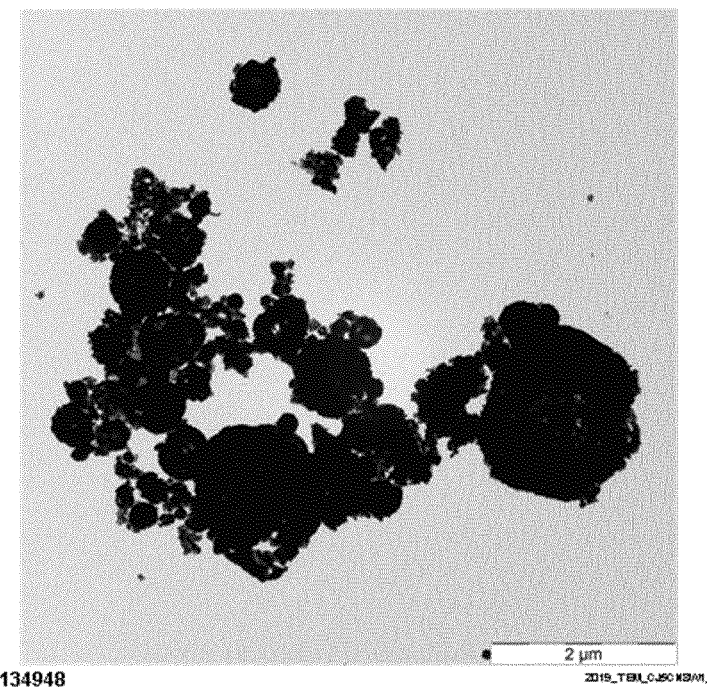
FIGS. 2A and 2B are TEM images of Li—La—Zr—Al mixed oxide (LLZO) particles prepared as described in comparative example 2.
Figure 2B:
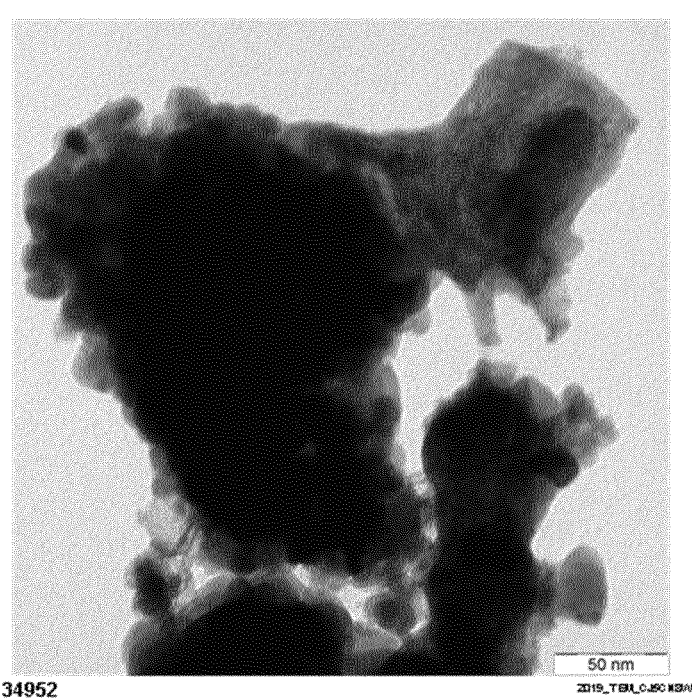

The particle properties are shown in table 1, the TEM images of the particles are shown in FIGS. 2A and 2B.

Example 1

Li—La—Zr—Al Mixed Oxide 1320 g of a commercial solution (Octa Solingen® Zirconium 12), containing 12 wt % Zr in the form of zirconium ethylhexanoate was mixed with 173 g of acetyl acetone. This solution was mixed under constant stirring with 2273 g of a commercial solution (Borchers® Deca Lithium 2), containing 2 wt % of Li in the form of lithium neodecanoate. A further solution, containing 1125 g $La(NO_3)_3*6H_2O$, 83.3 g $Al(NO_3)_3*9H_2O$, 2660 g ethanol and 2660 g ethylhexanoic acid (molar ratio ethanol:ethylhexanoic acid=3.1:1, water content in the solvent mixture: 2.7 wt %), was added under constant stirring until a clear solution was obtained. This solution corresponds to a composition $Li_{7.54}La_3Zr_2Al_{0.26}O_{12.66}$.

An aerosol was formed of 2.5 kg/h stream of this solution and 15 $Nm^3/h$ stream of air via a two-component nozzle and sprayed into a tubular reaction with a burning flame. The burning gases of the flame consisted of 12.9 $Nm^3/h$ hydrogen and 75 $Nm^3/h$ of air, resulting in a control temperature at the measurement point one meter below the spray nozzle of 900° C. Additionally, 25 $Nm^3/h$ of secondary air was used. After the reactor the reaction gases were cooled down and filtered.

Figure 3A:
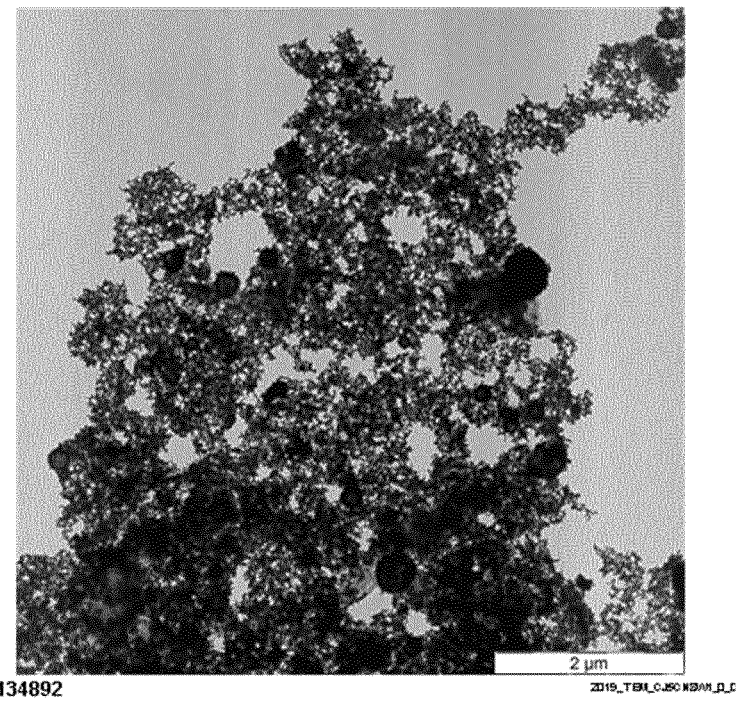
FIGS. 3A and 3B are TEM images of inventive Li—La—Zr—Al mixed oxide (LLZO) particles prepared as described in example 1.
Figure 3B:
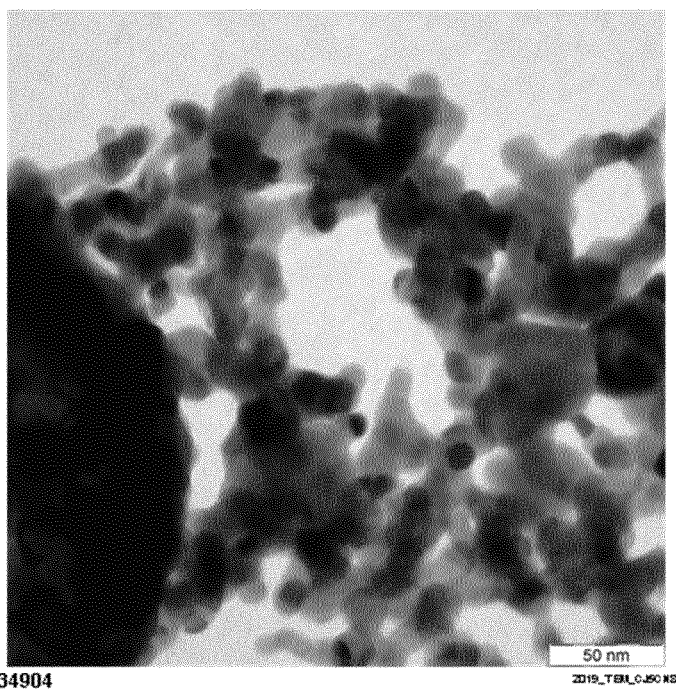

The particle properties are shown in Table 1, the TEM images of the particles are shown in FIGS. 3A and 3B.

Preparation of an NMC Powder Coated with Li—La—Zr—Al Mixed Oxide of Example 1

The NMC-powder (99 g) was mixed with 1.0 g (1 wt %) of the fumed powder of the example 1 in a high intensity laboratory mixer (Somakon mixer MP-GL with a 0.5 L mixing unit) at first for 1 min at 500 rpm (specific electrical power: 350 W/kg NMC) to homogeneously mix the two powders. Afterwards the mixing intensity was increased to 2000 rpm (specific electrical power: 800 W/kg NMC, tip-speed of the mixing tool in the mixing unit: 10 m/s) and the mixing was continued for 5 min to achieve the dry coating of the NMC particles by the fumed powder of the example 1.

Example 2

Calcined Li—La—Zr—Al Mixed Oxide

Figure 4:
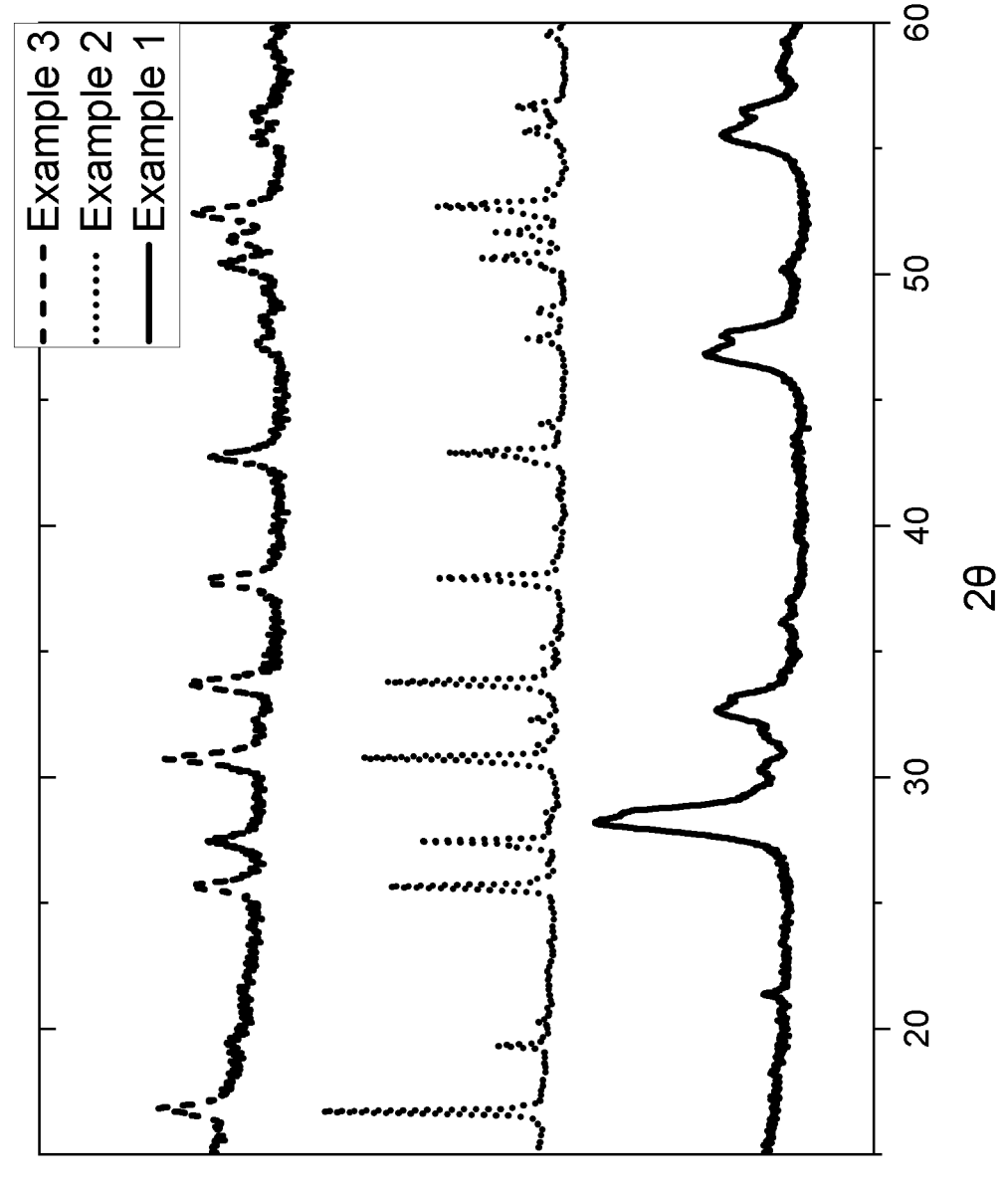
FIG. 4 shows XRD patterns of the inventive Li—La—Zr—Al mixed oxide (LLZO) prepared as described in examples 1-3.

The mixed oxide obtained in example 1 was calcined at 950° C. for 6 h in a rotary kiln. The XRD analysis (FIG. 4) showed, that the major phase of the product was the cubic garnet structure.

Example 3

Calcined and Ball Milled Li—La—Zr—Al Mixed Oxide

The mixed oxide obtained in example 2 was further ball milled by $ZrO_2$ balls with diameter of 0.5 mm in ethanol. The XRD analysis (FIG. 4) showed, that the major phase of the product was still the cubic garnet structure.

TABLE 1

| | | | Properties of the mixed oxides | | |
|---|---|---|---|---|---|
| Example | BET [$m^2/g$] | D10 [µm] | D50 [µm] | D90 [µm] | Tamped density [g/L] |
| Comparative Example 1 | 19 | 0.20 | 1.55 | 5.34 | 195 |
| Comparative Example 2 | 21 | 0.19 | 1.46 | 4.67 | 226 |
| Example 1 | 25 | 0.09 | 0.97 | 4.70 | 98 |
| Example 2 | <1 | 8.31 | 19.13 | 42.36 | 788 |
| Example 3 | 10 | 0.41 | 0.93 | 5.78 | 680 |

Analysis of LLZO-Coated Mixed Lithium Transition Metal Oxides by SEM-EDX

Figure 5:
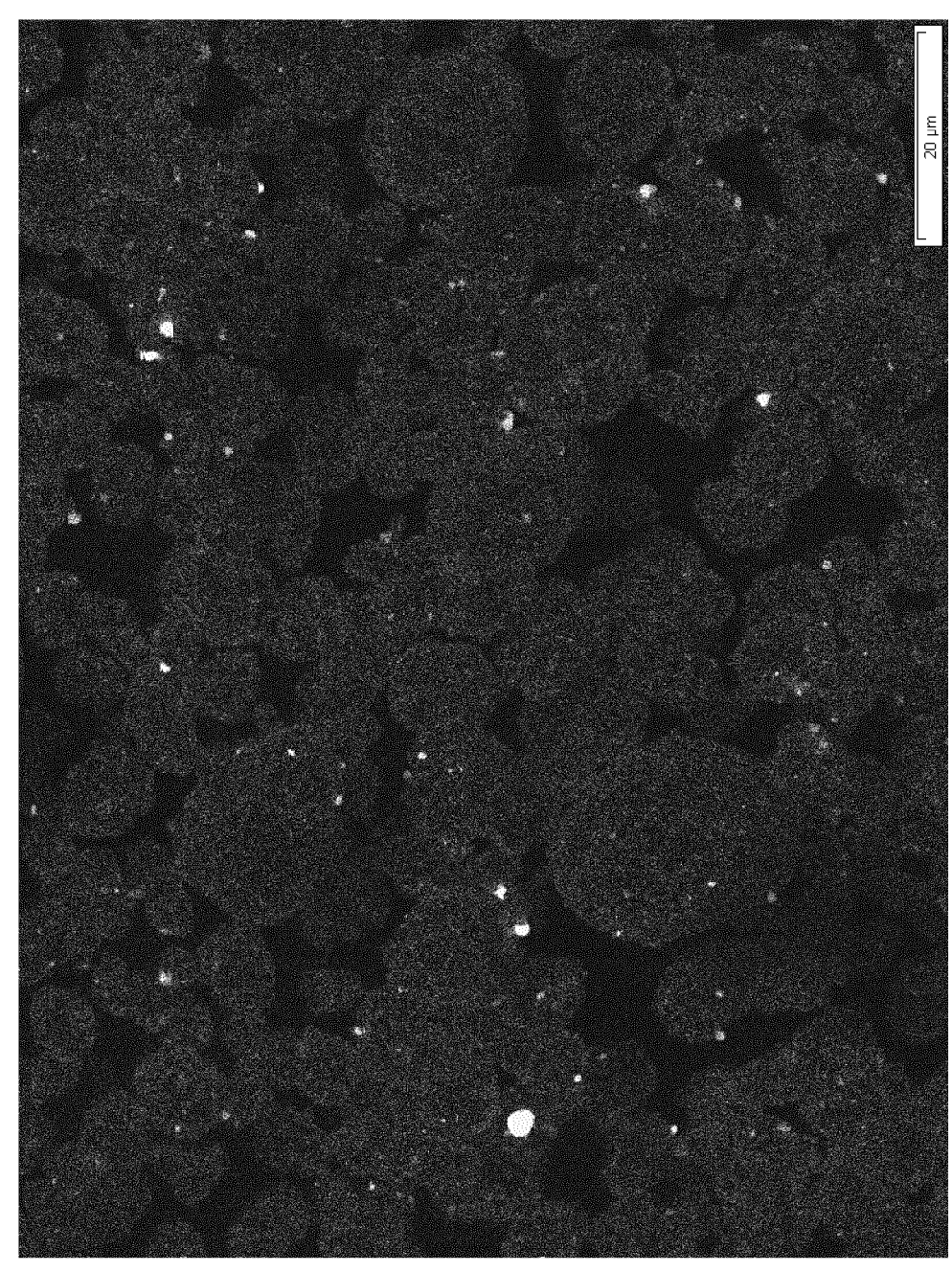
FIG. 5 shows SEM-EDX mapping image of La (white) on LLZO-coated NMC prepared using LLZO prepared as described in example 1.
Figure 6:
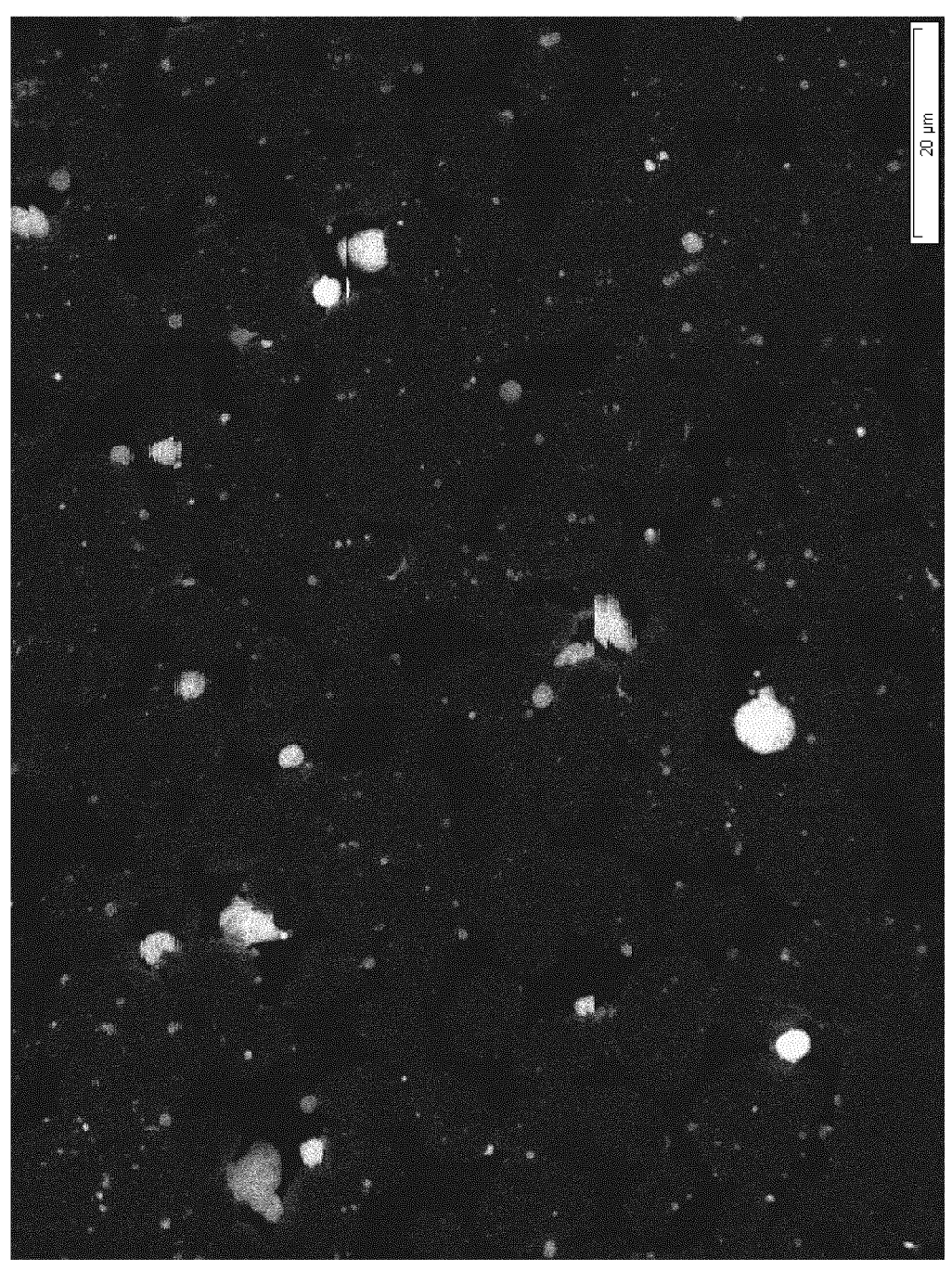
FIG. 6 shows SEM-EDX mapping image of La (white) on LLZO-coated NMC prepared using LLZO prepared as described in comparative example 1.

FIG. 5 shows the SEM-EDX mapping of La (white) on LLZO-coated NMC prepared using fumed nano LLZO (Example 1), FIG. 6 shows the results of the analysis of NMC coated with fumed coarse LLZO (Comparative Example 1). The axes of FIGS. 5 and 6 show: x axis=diameter of particles; the lefty axis=volume in %, the right y axis=cumulative volume in %. NMC mixed oxide dry coated with fumed nano LLZO (Example 1), shows a full and homogeneous coverage of all NMC particles with LLZO (FIG. 5). No larger LLZO agglomerates were detected, showing a good dispersibility of nanostructured fumed nano LLZO. Additionally, no free unattached LLZO-particles next to the NMC particles were found, indicating the strong adhesion between coating and the substrate (NMC). In contrast, FIG. 6 shows that only the fine LLZO-particles of fumed coarse LLZO are attached to the surface of NMC particles. The larger LLZO-particles are non-dispersed and are therefore unattached, located next to the NMC particles. As a result, the NMC particles are not fully covered by zirconium oxide.

Figure 7:
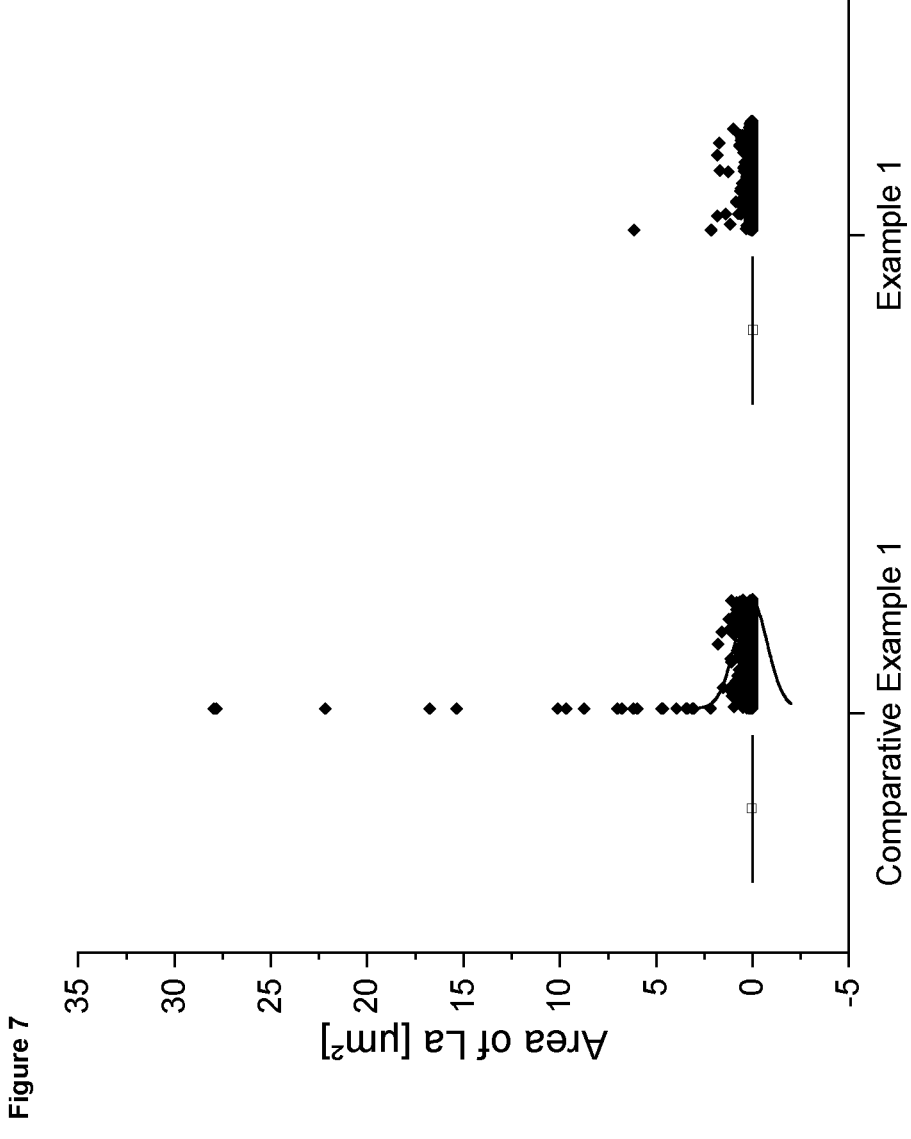
FIG. 7 shows the statistical analyses of the area distribution of La in the SEM-EDX mapping images of LLZO-coated NMC prepared using LLZO prepared as described in comparative example 1 and example 1.

FIG. 7 shows the statistical analyses of example 1 and comparative example 1. The area distribution of La (white) $µm^2$ in the SEM-EDX mapping is further analyzed by box normal plot and shows a clear difference of the dispersibility of La (white) between example 1 and comparative example 1.

Preparation of Hybrid Solid Electrolyte (HSE) Membrane

Mixing LLZO ceramic powder with polyethylene oxide (PEO) and LiTFSI resulted in solvent-free, hot pressing procedure, yielding flexible and freestanding membranes. Two sets of composite membranes with LLZO from example 2 and example 3 have been prepared according to Table 2. The HSE membrane of weighted LLZO was ground, milled with PEO and weighted LLZO to obtain a paste-like material, which was then annealed at 100° C.

overnight, successively hot-pressed at 100° C. between Teflon substrates for a desired thickness about 110 μm.

TABLE 2

| Recipe of hybrid solid electrolyte | | | | |
|---|---|---|---|---|
| EO/Li | PEO + LiTFSI (g) | LLZO (g) | LLZO wt % | LLZO type |
| 15 | 0.697 + 0.303 | 0.42 | 30% | Example 2 |
| 15 | 0.697 + 0.303 | 0.42 | 30% | Example 3 |

Assembly and Characterizations of All-Solid-State Lithium Metal Batteries

Figure 8:
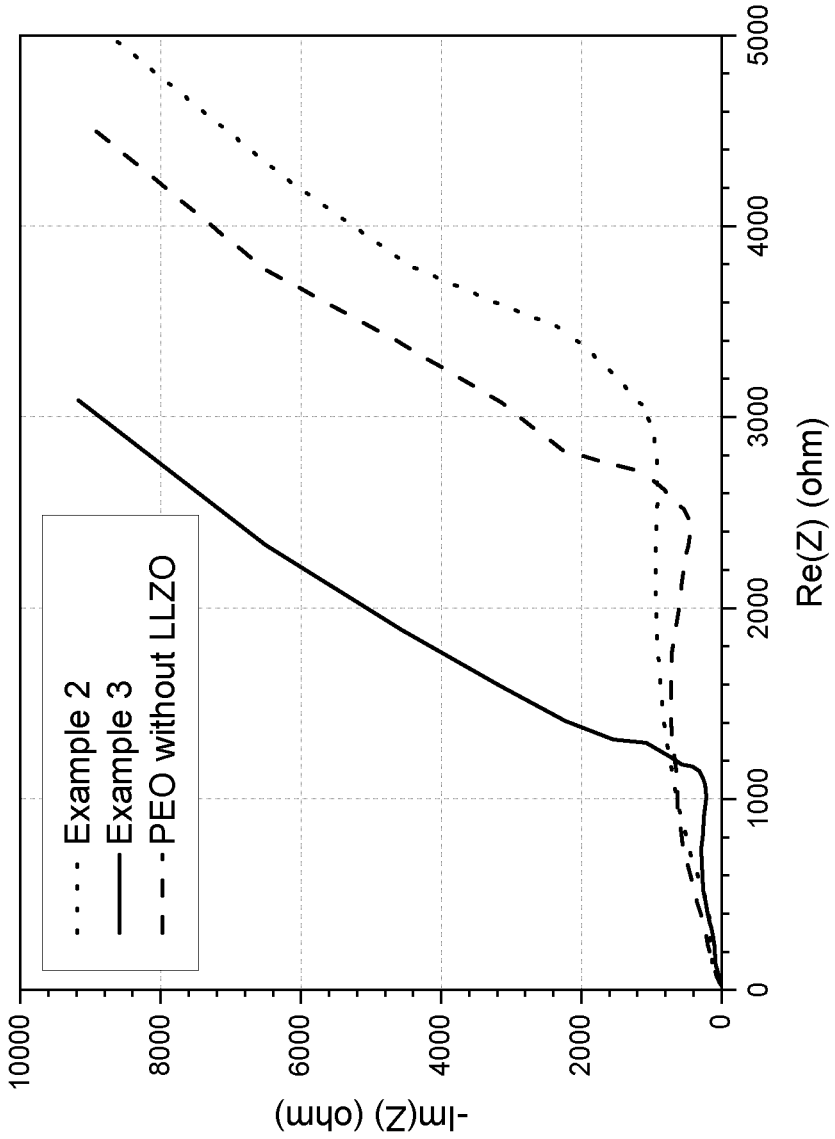
FIG. 8 shows the results of the initial impedance tests of all-solid-state Li metal batteries with LLZO prepared as described in examples 2 and 3 and without LLZO (PEO), measured by electrochemical impedance spectroscopy (EIS).
Figure 9:
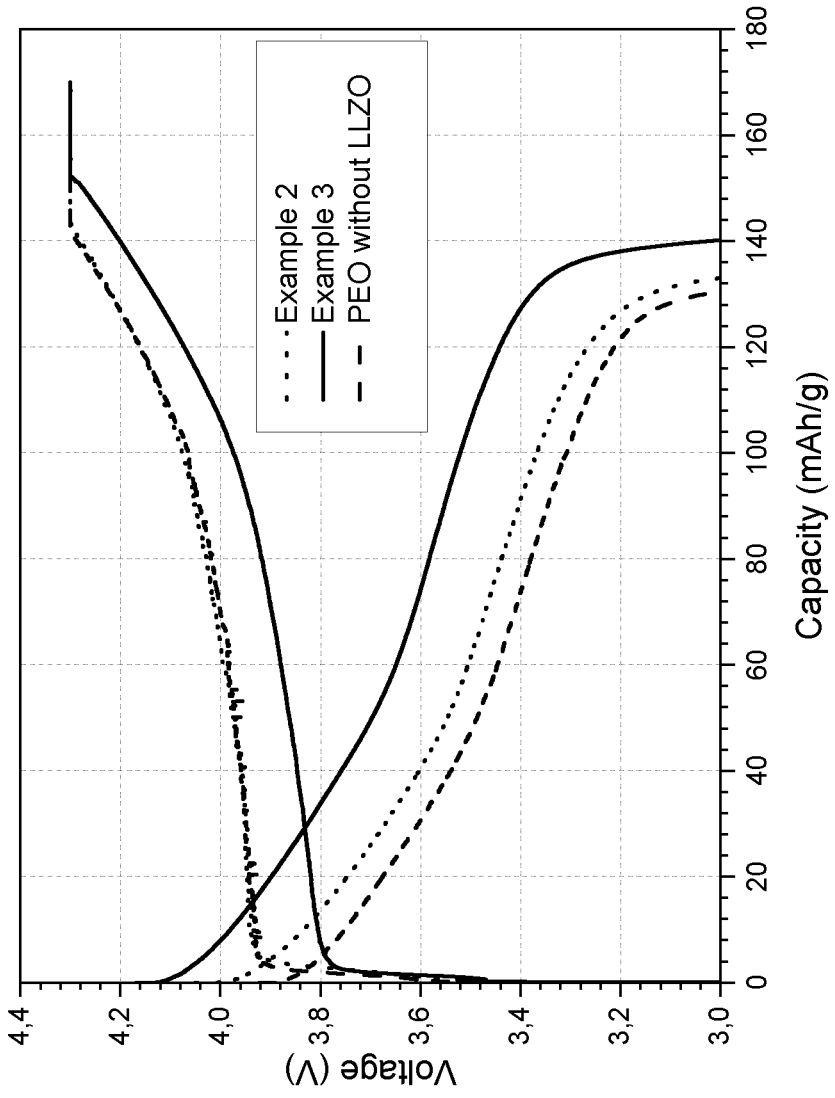
FIG. 9 shows the results of the initial formation between 3.0V and 4.3V at 60° C. and 0.1 C of all-solid-state Li metal batteries with LLZO prepared as described in examples 2 and 3 and without LLZO (PEO).

Three sets of all-solid-state NMC_HSE_Li metal batteries were assembled using (a) PEO without LLZO filler, (b) PEO using calcined LLZO (Example 2) filler and also (c) PEO using ball-milled LLZO (Example 3) filler. The initial impedance was analyzed by electrochemical impedance spectroscopy (EIS) and the results are shown in the FIG. 8. FIG. 9 shows the initial formation of these three cells between 3.0V and 4.3V at 60° C. and 0.1 C. The cell using LLZO from Example 3 showed the highest capacity of 140 mAh/g at 0.1 C discharge and the lowest impedance among three examples.

The invention claimed is:

1. A process for producing a mixed oxide comprising lithium, zirconium and optionally at least one metal other than Li and Zr metal, by flame spray pyrolysis, the process comprising:
    flame spray pyrolyzing at least one solution of metal precursors, comprising
    (i) at least one carboxylate selected from the group consisting of a lithium carboxylate and a zirconium carboxylate, wherein the at least one carboxylate comprises from 5 to 20 carbon atoms; and
    (ii) a solvent mixture comprising an alcohol and a carboxylic acid comprising from 5 to 20 carbon atoms, wherein the solvent mixture comprises less than 10 wt. % water, and a molar ratio of the alcohol to the carboxylic acid is from 1:20 to 20:1,
    wherein the mixed oxide is a compound of the following formula $$Li_aZr_bM_cO_{0.5a+2b+d} \qquad (I),$$

wherein
    $1.5 \leq a \leq 15$,
    $0.5 \leq b \leq 3.0$,
    $0 \leq c \leq 5$,
    $d = 1.5c$ for M=Al and La,
    and
    thermally treating the mixed oxide produced by the flame spray pyrolysis,
    wherein the thermally treated mixed oxide has a tamped density of from 20 to 1000 g/L.

2. The process of claim 1, wherein the spray flame pyrolyzing comprises:
    (a) atomizing at least one solution of metal precursors to afford an aerosol with an atomizer gas;
    (b) bringing the aerosol to reaction in a reaction space of a reactor with a flame obtained by ignition of a mixture of fuel gas and an oxygen-comprising gas to obtain a reaction stream;
    (c) cooling the reaction stream to obtain a solid metal oxide; and (d) removing the solid metal oxide from the reaction stream.

3. The process of claim 1, wherein the mixed oxide has a BET surface area of from 0.1 to 100 m²/g.

4. The process of claim 1, wherein the lithium and zirconium carboxylates, independently of each other, comprise pentanoate (C5), hexanoate (C6), heptanoate (C7), octanoate (C8), nonanoate (C9), decanoate (D10), undecanoate (C11), dodecanoate (C12), tridecanoate (C13), tetradecanoate (C14), pentadecanoate (C15), hexadecanoate (C16), heprtadecanoate (C17), octadecanoate (C18), nonadecanoate (C19), icosanoate (C20), or a mixture thereof, of lithium and/or zirconium, each carboxylate being independently linear, branched, or cyclic.

5. The process of claim 1, wherein the alcohol is selected from the group consisting of methanol, ethanol, n-propanol, iso propanol, n-butanol, sec-butanol, tert-butanol, n-pentanol, n-hexanol, cyclohexanol, n octanol, 2-ethylhexanol, n-decanol, neodecanol, and a mixture thereof.

6. The process of claim 1, wherein the at least one solution of metal precursors comprises a chelating agent selected from the group consisting of a diamine, 1,3-dicarbonyl compound, and a mixture thereof.

7. The process of claim 1, wherein the mixed oxide has a numerical $d_{50}$ mean particle diameter of from 0.05 to 2 μm, as determined by static light scattering (SLS).

8. The process of claim 1, wherein the thermally treating is carried out at a temperature of from 600 to 1300° C.

9. The process of claim 1, further comprising:
    milling the mixed oxide produced by the flame spray pyrolysis.

10. The process of claim 9, wherein the milling is ball milling.

11. The process of claim 1, wherein the tamped density of the mixed oxide is from 20 to 800 g/L.

12. The process of claim 1, wherein the tamped density of the mixed oxide is from 400 to 800 g/L.

13. A mixed oxide, comprising:
    lithium;
    zirconium; and
    optionally at least one other metal than Li and Zr metal,
    wherein the mixed oxide is in the form of aggregated primary particles,
    wherein the mixed oxide has a BET surface area of from 15 to 50 m²/g,
    wherein the mixed oxide has a $d_{50}$ numerical mean particle diameter of from 0.1 to 2 μm, as determined by static light scattering (SLS), and
    wherein the mixed oxide has a tamped density of from 30 to 150 g/L.

14. A solid-state electrolyte or electrode of a lithium ion battery, comprising:
    the mixed oxide of claim 13 as a component of a solid-state electrolyte or as an additive in liquid, or gel electrolyte, or a constituent of the electrode of a lithium ion battery.

15. A lithium ion battery, comprising:
    the mixed oxide of claim 14.

16. A mixed oxide, comprising:
    lithium;
    zirconium; and
    optionally at least one metal other than Li and Zr metal,
    wherein the mixed oxide is in the form of aggregated primary particles,
    wherein the mixed oxide has a BET surface area of less than 10 m²/g, wherein the mixed oxide has a $d_{50}$ numerical mean particle diameter of from 1 to 50 μm, as determined by static light scattering (SLS), and wherein the mixed oxide has a tamped density of from 400 to 1000 g/L.

* * * * *